(12) United States Patent
Glover et al.

(10) Patent No.: US 6,466,724 B1
(45) Date of Patent: Oct. 15, 2002

(54) HIGH DENSITY FIBRE OPTIC CONNECTOR INTERFACE

(75) Inventors: Richard J. Glover, Stittsville (CA); Marius N. Preda, Hull (CA); Simon E. Shearman, Almonte (CA); Grant K. Pacey, Stittsville (CA); Rod Muir, South Mountain (CA)

(73) Assignee: Nortel Networks Limited, Montreal (CA)

( * ) Notice: Subject to any disclaimer, the term of this patent is extended or adjusted under 35 U.S.C. 154(b) by 14 days.

(21) Appl. No.: 09/645,558

(22) Filed: Aug. 24, 2000

(51) Int. Cl.[7] .................................................. G02B 6/00
(52) U.S. Cl. ...................................... 385/135; 439/716
(58) Field of Search ............................... 385/53–56, 59, 385/70, 135; 439/713, 716, 115, 116, 121, 122, 131

(56) References Cited

U.S. PATENT DOCUMENTS

| | | | | |
|---|---|---|---|---|
| 4,832,436 A | * | 5/1989 | Goto et al. ................... 385/53 |
| 5,123,071 A | * | 6/1992 | Mulholland et al. .......... 385/53 |
| 5,446,822 A | * | 8/1995 | Keith .......................... 385/135 |
| 5,497,444 A | * | 3/1996 | Wheeler ..................... 385/135 |
| 5,511,144 A | * | 4/1996 | Hawkins et al. ............ 385/135 |
| 5,553,180 A | * | 9/1996 | Belenkiy et al. .............. 385/59 |
| 5,708,742 A | | 1/1998 | Beun et al. ................... 385/53 |
| 5,717,812 A | * | 2/1998 | vandenEnden et al. ..... 385/135 |

* cited by examiner

*Primary Examiner*—Tulsidas Patel
*Assistant Examiner*—Hae Moon Hyeon

(57) ABSTRACT

A high density fiber optic connector interface for an electro-optic circuit pack is disclosed. The fiber optic connector interface comprises a elongated housing having an elongated base plate and side walls, a plurality of cable connection assemblies arrayed on the elongated base plate of the housing, and a plurality of slider mechanisms mounted on the elongated base plate. Each cable connection assembly is slanted relative to longitudinal axis of the housing. All the assemblies are arrayed in a row along a line slanted relative to longitudinal axis of the housing with the neighboring assemblies being overlapped. Each cable connection assembly includes an internal cable connector, an external cable connector, an adaptor for receiving the internal and external connectors, and an adaptor holder for holding at least one adaptor. Each slider mechanism supports a respective one of cable connection assemblies so that each cable connection assembly can slidably be snapped-out away from the housing for access and slidably snapped-in into the operating position. Each cable connection assembly includes a transmission failure indicating means.

23 Claims, 9 Drawing Sheets

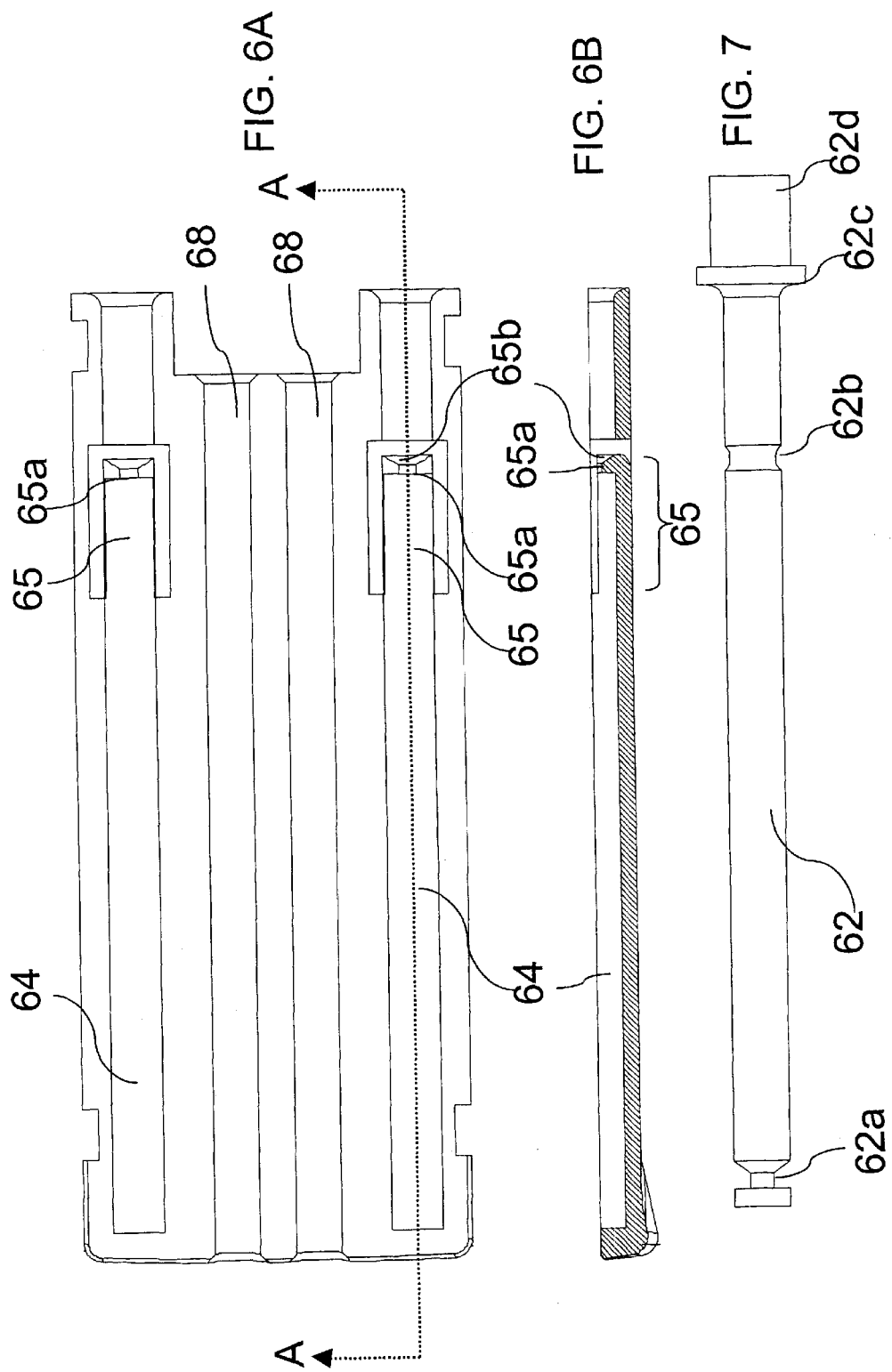

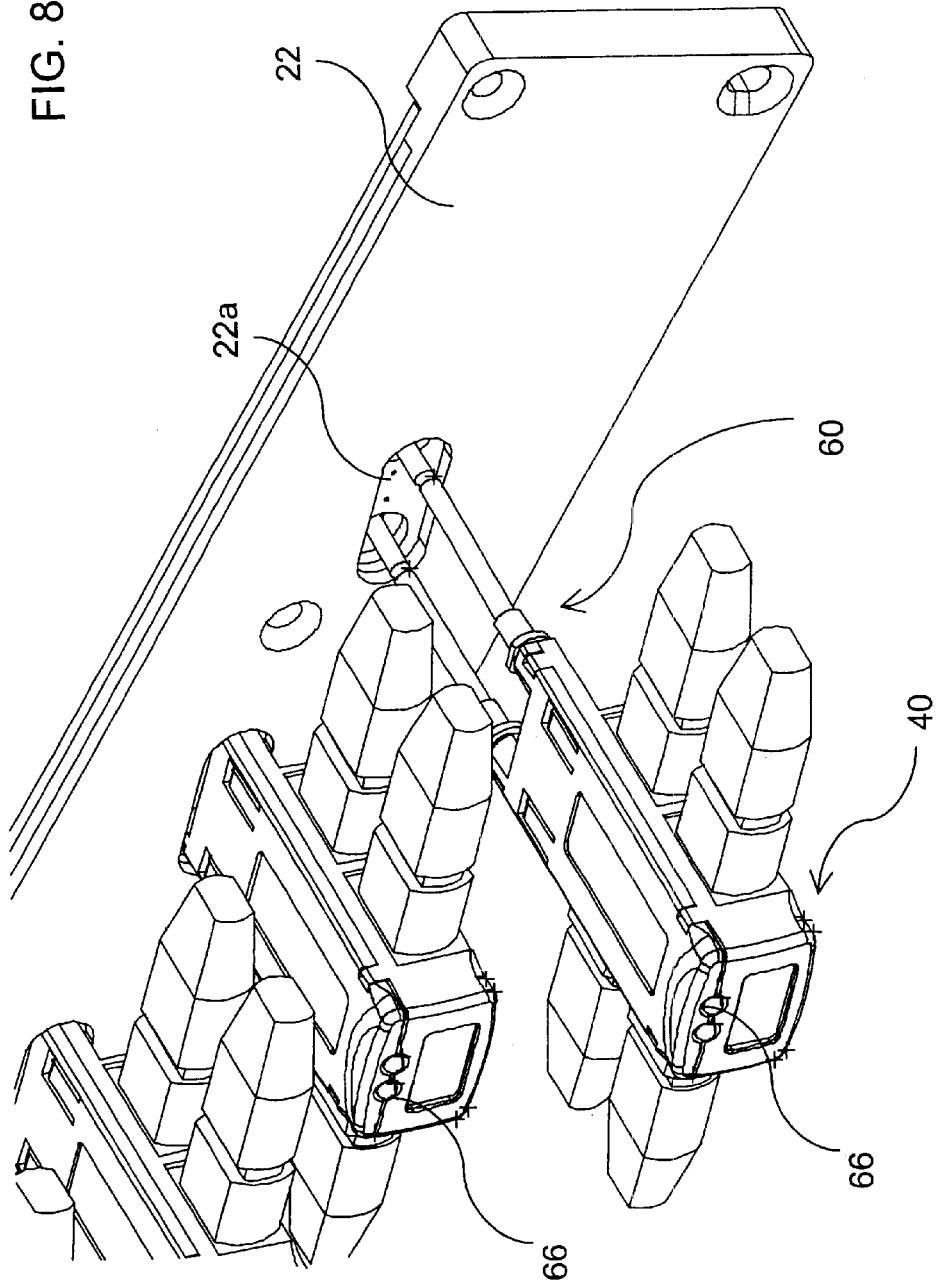

HIGH DENSITY FIBRE OPTIC CONNECTOR INTERFACE

FIELD OF THE INVENTION

The present invention relates generally to a fibre optic connector interface, and particularly relates to a new high density fiber optic connector interface that allows for easy access of every single fibre optic connection.

BACKGROUND OF THE INVENTION

Typically, in existing structures of circuit packs to be mounted in shelves, a front faceplate is provided. Through a cable connector interface arranged on the faceplate, a number of internal cables (or circuit cables) and external cables (or customer side cables) are coming in and going out from the circuit pack. The number of the cable connections corresponding to those of the internal or external cables take place inside the cable connector interface. Each of the cable connections are required to be accessed individually and frequently for inspection or maintenance purposes. Furthermore, every access must be carefully controlled. For example, tool access to the cable connection for maintenance or inspection is required to be carried out with little or no disturbance to any other neighboring cable connections or cables. Also, the cable connector interface is desired to accommodate as many cable connectors as possible in a limited space.

The inventors have developed a new inventive concept for a high density fibre optic connector interface, in which a large number of fiber optic connectors and cables are accommodated in a small volume of space and easy access to every single cable connection is allowed without disturbing other neighboring ones, while meeting stringent requirements of fibre optic cable management, for example, a minimum cable bend radii.

Accordingly, it is an object of the present invention to provide a new fibre optic connector interface in which a high density of cable connections is realized.

It is another object of the present invention to provide a new fibre optic connector interface having a slider mechanism in which easy and controlled access to every single connection or cable is allowed with little or no disturbance to neighboring ones.

It is another object of the present invention to provide a new fibre optic connector interface having a transmission indicating means in which an observation of operating status in a circuit pack is allowed from the outside during normal operations.

SUMMARY OF THE INVENTION

In accordance with the present invention, there is provided a high-density fibre optic connector interface for an electro-optic circuit pack which provides a high density of cable connections while enabling easy and controlled access for maintenance and inspection purposes. The high density fibre optic connector interface generally comprises an elongated base member, a plurality of cable connection assemblies arrayed along the elongated base member, and a plurality of slider mechanisms each corresponding to a respective one of the cable connection assemblies, each of the slider mechanisms comprising a slider pin, first end of the slider pin being fixed on the elongated member and the remainder being slidably disposed in a slider bore provided in the body of the corresponding cable connection assembly, thereby enabling each individual cable connection assembly to be slidably drawn away from the elongated base member for access and to be slidably pushed back into an operating position against the base member.

Each cable connection assembly preferably comprises a first cable connector, a second cable connector, an adaptor for receiving the first and second cable connectors, and an adaptor holder. The adaptor holder includes a resilient flange which cooperates with an opening provided therein so that the adaptor is snapped-in and held in place. Preferably, the adaptor holder may hold one or more adaptors, each of which receives a first cable connector and a second cable connector.

According to another preferred feature of the invention, the high density fibre optic connector interface includes an elongated housing defined in part by the elongated base member. The elongated housing may include a housing cover. Preferably, a frontal face of each cable connection assembly is exposed to the outside through an associated window provided in the housing cover so that visual inspection of each assembly is allowed with the housing cover closed. Furthermore, the elongated housing includes orifices through which cables enter and exit from the connector interface.

According to another preferred feature of the invention, each cable connection assembly is slanted relative to longitudinal axis of the housing. All the cable connection assemblies are arrayed in a row along a line slanted relative to longitudinal axis of the housing and extending lengthwise of the housing with the neighboring assemblies being in overlapping relation to each other. Preferably, one or more rows of cable connection assemblies may be arrayed likewise.

According to another preferred feature of the invention, each slider mechanism provides a snap action effect to releasably retain each cable connection assembly in the access position and the operating position and the slider mechanism is integrated with the cable connection assembly. Each one of the slider mechanisms comprises a pair of parallel slider pins, first ends of the slider pins being fixed on the elongated base member and the remainder being slidably disposed in a respective one of slider bores provided in the body of the cable connection assembly, allowing the cable connection assembly to be slidably movable along the slider pins toward and away from the elongated base member.

Preferably, the slider bore further includes a resilient member having a protrusion which cooperates with a circular groove provided in the slider pin to provide the snap action effect so that the cable connection assembly is prevented from escaping from the slider pin and releasably held in place when in the access position. Furthermore, the resilient member with the protrusion cooperates with another circular groove provided in the slider pin so that the cable connection assembly is releasably held in place when in the operating position. Also, the protrusion includes a slant face for facilitating an initial insertion of the cable connection assembly into the slider pin.

According to another preferred feature of the invention, each cable connection assembly may include a transmission failure indicating means. Preferably, each cable connection assembly may include one or more transmission failure indicating means. The transmission failure indicating means comprises a light pipe fixedly disposed in a through-hole provided in the body of the cable connection assembly for transmitting a failure indicating light signal via a hole provided in the elongate base member and then the light pipe to a maintenance personnel. Preferably, the failure indicating light signal may be seen through the window with the housing cover closed.

A further understanding of the other features, aspects, and advantages of the present invention will be realized by reference to the following description, appended claims, and accompanying drawings.

BRIEF DESCRIPTION OF THE DRAWINGS

The embodiments of the invention will now be described with reference to the accompanying drawings, in which:

FIG. 6A is a plan view showing in part the configuration of the slider mechanism;

FIG. 6B is a cross-sectional view along the line A—A in the FIG. 6A;

FIG. 7 is a side view of a slider pin of the slider mechanism;

FIG. 8 is an enlarged view showing the snap-out position of the cable connection assembly;

DETAILED DISCLOSURE OF THE EMBODIMENT(S)

Figure 1A:
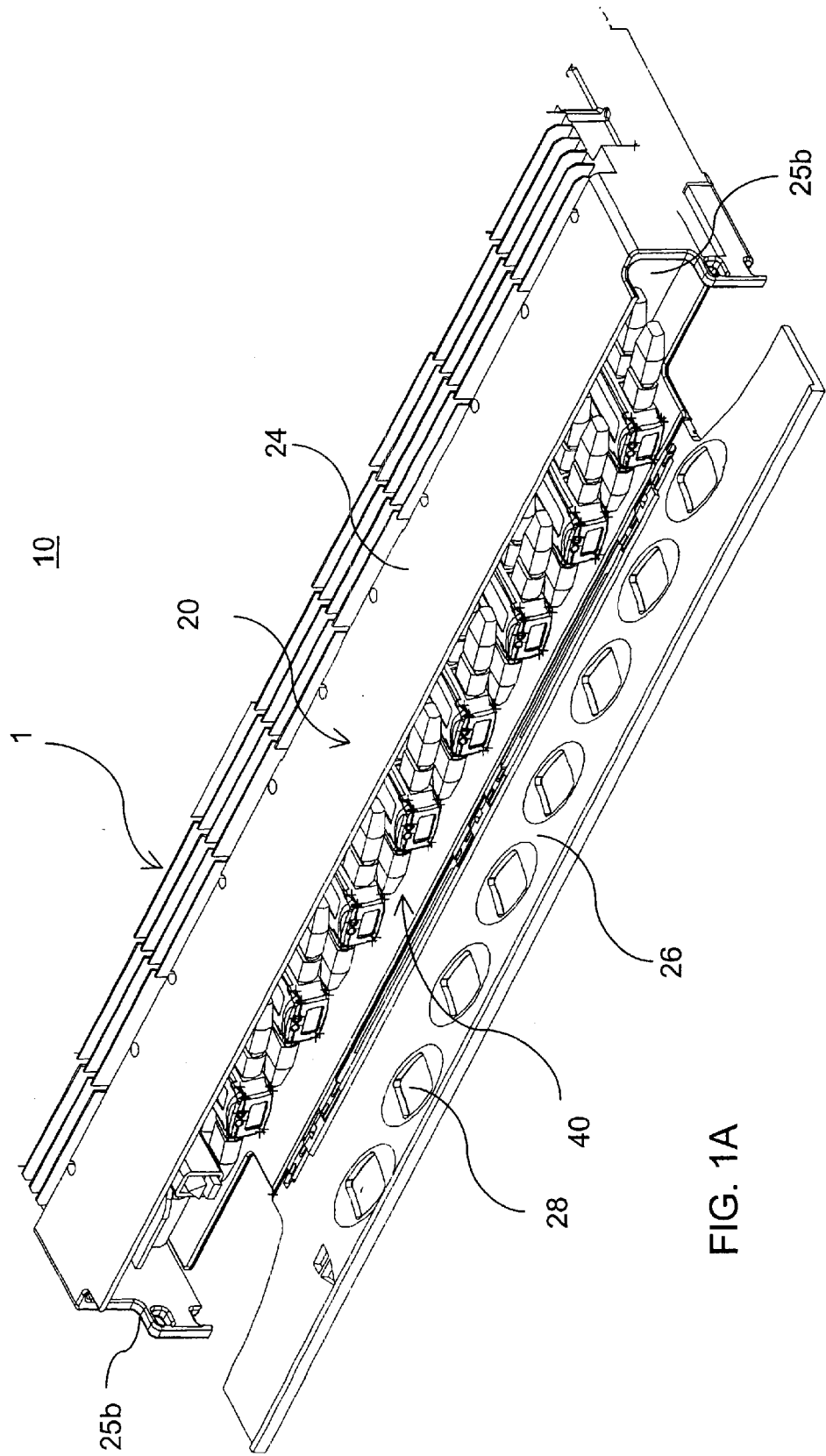
FIG. 1A is a perspective view of a high density fibre optic connector interface in accordance with the present invention.
Figure 1B:
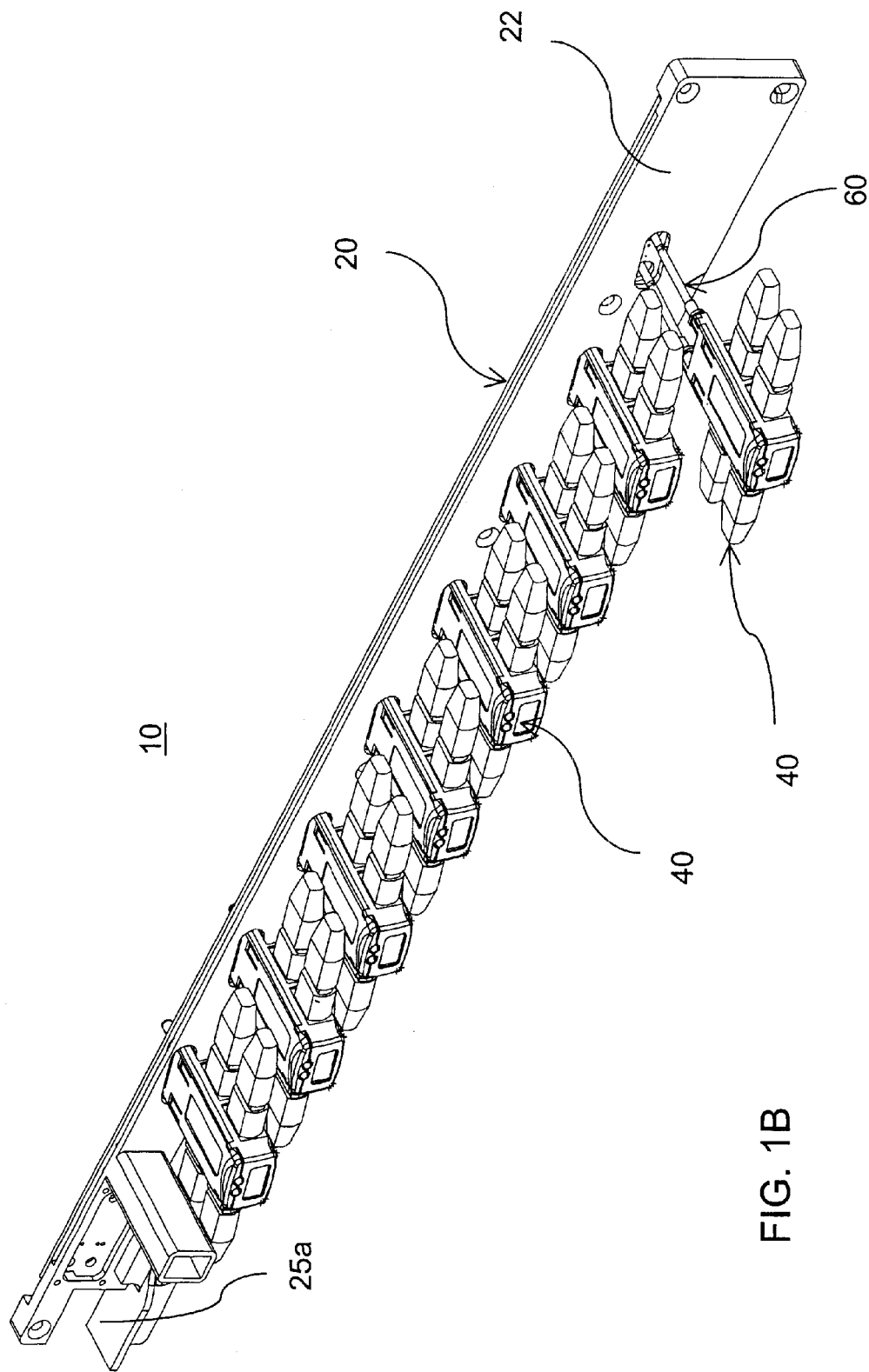
FIG. 1B is a perspective view of the high density fibre optic connector interface without the sidewalls of the housing.

FIGS. 1A and 1B are perspective views of a preferred embodiment of the present invention which represent a high density fibre optic connector interface and is denoted generally as a reference numeral 10. Typically the high density fibre optic connector interface is attached to the front side of electro-optic circuit pack 1 (partly shown in the FIG. 1A). For convenience of description, the high density fibre optic connector interface is hereinafter referred as to the "connector interface." As is shown in the figures, the connector interface 10 generally comprises a housing 20, a plurality of cable connection assemblies 40 arranged inside the housing, and a plurality of slider mechanisms 60.

Referring to FIG. 1B, each of the slider mechanisms 60 supports one of the cable connection assemblies 40 corresponding to it. Each of the cable connection assemblies 40 is able to snap-out away from the housing by the slider mechanism 60, providing easy access for inspection and maintenance purposes, like the rightmost one in the figure, and also must be able to snap-in into the original position, i.e. the operating position. The terms "snap-out" and "snap in" are used to describe movement of the cable connection assembly into an exposed position for visual or tool access, and movement of the assembly into the operating position, respectively. Every single cable connector assembly can be fully withdrawn for inspection or maintenance by virtue of the slider mechanism without disturbing any neighboring assemblies. Details of the slider mechanism will be described hereafter, referring to FIGS. 5, 6, and 7.

As is illustrated in FIGS. 1A and 1B, the housing 20 includes an elongated base member 22, on which the cable connection assemblies are arrayed in a row, and preferably, sidewalls 24 extending forwards from and along the edge of the elongated base member 22. Furthermore, the housing 20 may include a housing cover 26 as shown in FIG. 1A. In the figure, the housing cover 26 is attached hingedly to the edge of the bottom side wall, but may be attached to any one of the sidewalls 24, such as the upper sidewall or the left or right sidewalls. The housing cover 26 is provided with a plurality of windows 28 at the positions corresponding to the front face of each of the cable connection assemblies 40, so that the front faces are able to be exposed to the outside through the windows 28 with the cover 26 closed, as is clearly depicted in FIG. 3B. Further details will be described below, with reference to the description of the slider mechanism.

Figure 2A:
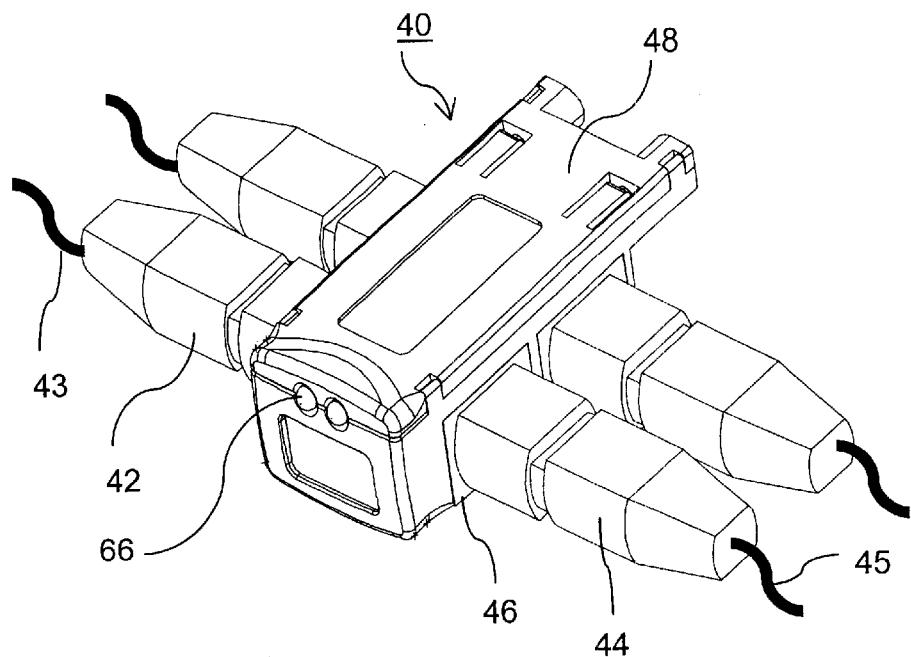
FIG. 2A is a perspective view of a cable connection assembly.
Figure 2B:
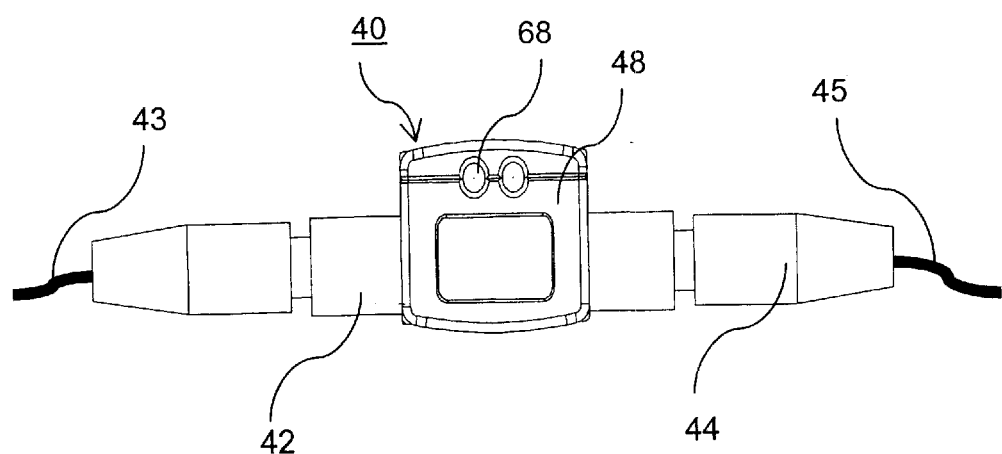
FIG. 2B is a front view of the FIG. 2A.

In FIGS. 2A and 2B, respectively, there are shown a perspective and a front view of the single cable connection assembly. Referring to these figures, each of the cable connection assemblies 40 comprises a first cable connector 42, a second cable connector 44, an adaptor 46 receiving the first and second cable connectors at both sides, and an adaptor holder 48. A first cable 43 and a second cable 45 extend from the first and the second cable connector respectively. In all the other figures, the cables 43, 45 are omitted for reasons of clarity, except when required for description. Typically a cable coming into the circuit pack 1 shown in FIG. 1 is called "an internal cable," "a circuit cable," or "a module side cable," and a cable outgoing from the circuit pack 1 via the cable connection assembly 40 is called "an external cable," or "a customer side cable." In the embodiment, the first cable 43 may represent an internal cable, the second cable an external cable, and vice versa.

Each cable connection assembly of this embodiment provides a pair of cable connections, meaning that the adaptor holder 48 holds two adaptors 46 which, in turn, receive a first cable connector 42 and a second one 44 respectively. As is apparent to those skilled in the art, each cable connection assembly may provide two or more cable connections, if desired.

Each of the cable connection assemblies 40 is positioned so that the cables, and their connectors and adaptors are running parallel to the elongated base member 22 of the housing.

Figure 3A:
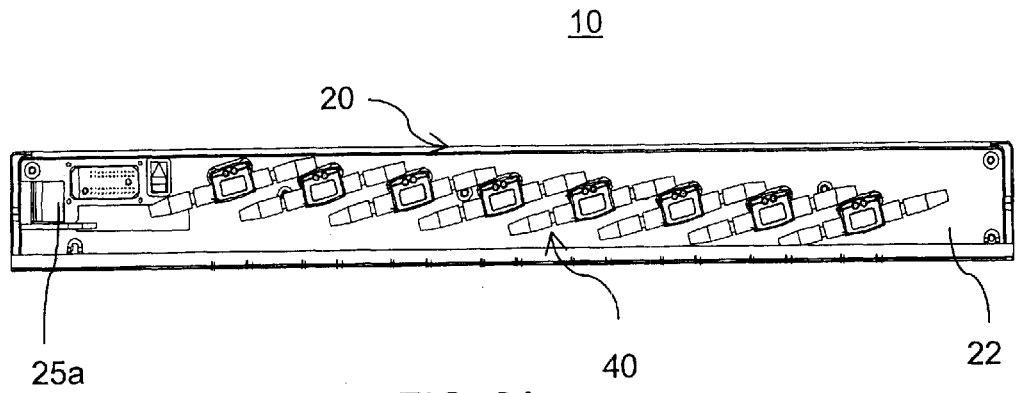
FIG. 3A is a front view of the high density fibre optic connector interface with the housing cover opened.
Figure 3B:
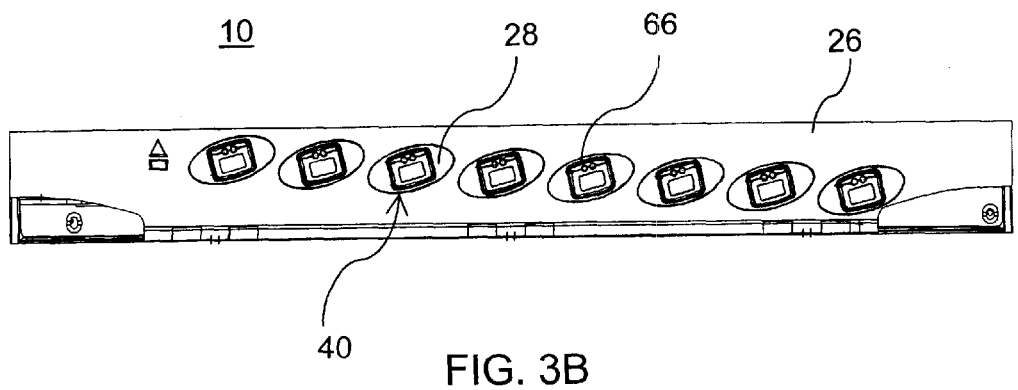
FIG. 3B is a front view of the high density fibre optic connector interface with the housing cover closed.
Figure 3C:
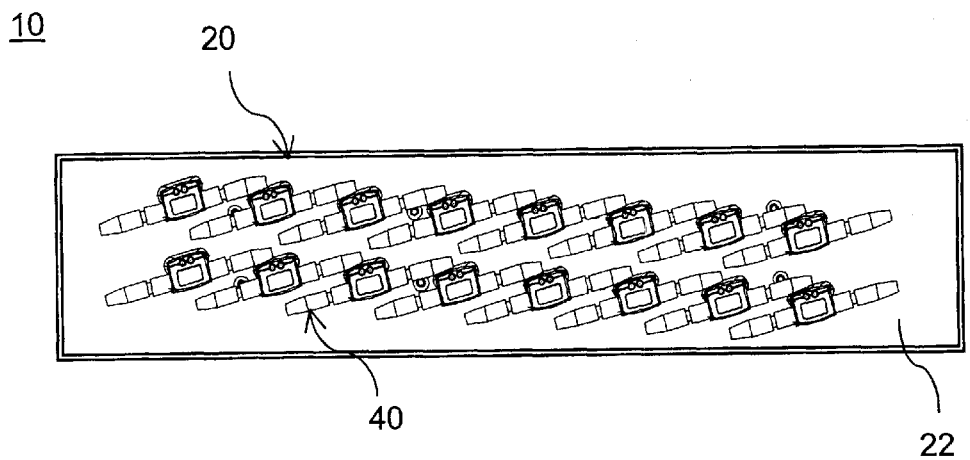
FIG. 3C is a schematic front view of the high density fibre optic connector interface showing plural rows of cable connection assemblies with the housing cover opened.

The present embodiment provides a relatively high density of cable connections. FIGS. 3A and 3B illustrate front views of the high density fibre optic connector interface with the housing cover 26 opened and closed respectively. Referring to these figures, together with FIGS. 1A and 1B, a way in which the high density of cable connections can be accomplished is described. FIG. 3A shows the way in which a number of cable connection assemblies 40 are arrayed inside the storage area defined by the housing 20. As is shown in the figure, the individual cable connection assemblies 40 are each slanted relative to the horizontal, and all the assemblies are arrayed in a row along a line slanted relative to the horizontal and extending generally lengthwise of the housing with being the neighboring assemblies overlapped so that a high density of cable connections can be readily realized in a limited space, while allowing an easy access of the individual for inspection or maintenance purposes. In this embodiment, although one row of cable connection assemblies is provided, one or more rows of assemblies may be arranged onto the elongated base member 22 in a similar way, if desired.

FIG. 3B shows a front view of the connector interface with the housing cover 26 closed. As is shown in the figure, the front faces of the cable connection assemblies 40 are exposed to the outside through the windows 28 provided in the housing cover 26, allowing for a visual observation or inspection. Preferably, the connector interface 10 is provided in the front face of the cable connection assembly with a status indication means 66, details of which will be described hereafter, referring to FIG. 5.

Preferably, the connector interface 10 is provided in the elongated base member 22 and the sidewall 24 of the housing respectively with orifices 25a, 25b (The orifice 25a is depicted in FIG. 3A and the orifice 25b in FIG. 1A), through which all the internal cables can go into the circuit pack 1 while all the external cables go out from the housing 20.

Figure 4:
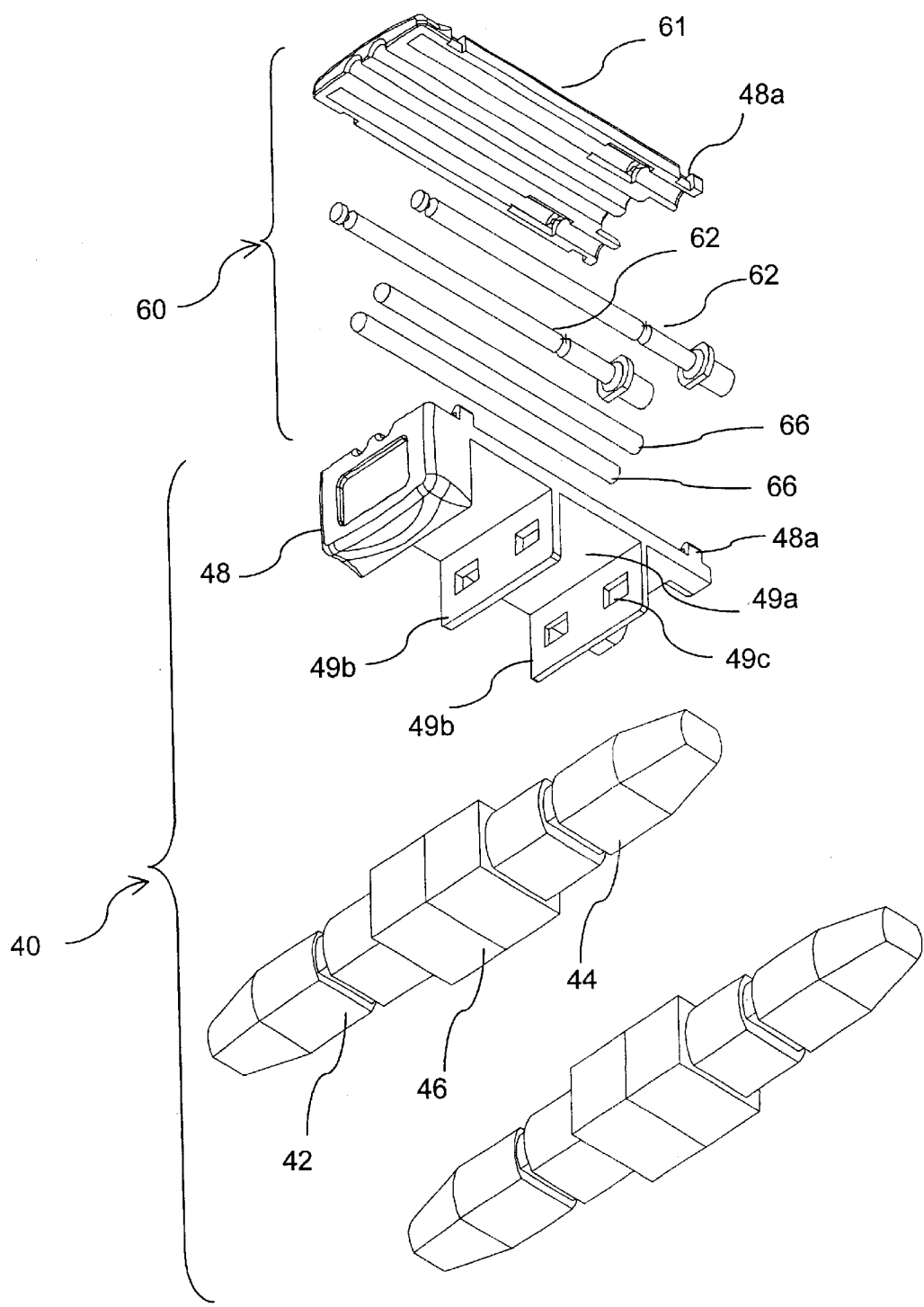
FIG. 4 is an exploded view of a cable connection assembly of the high density fibre optic connector interface.

FIG. 4 shows an exploded view of the cable connection assembly of the connector interface. As is described above, the cable connection assembly 40 comprises a first cable connector 42, a second cable connector 44, an adaptor 46 receiving the first and second cable connectors at the both sides, and an adaptor holder 48. In this embodiment, although the adaptor holder 48 holds two adaptors 46, one or more adaptors may be employed if desired. As is depicted in the figure, the adaptor holder 48 comprises a base plate 49a perpendicular to the elongated base member 22 of the housing, and several resilient flanges 49b extending perpendicularly from the base plate 49a and parallel to the elongated base member 22. Preferably, the resilient flange 49b is provided with an opening 49c so that the adaptor 46 can be easily snapped into the holder 48. Furthermore, the structure of the resilient flanges 49b and the spacing between them may be varied to accept various kinds of adaptors, and additional resilient flanges may be added for receiving more adaptors, which, in turn, allows for even more cable connections.

In this embodiment, the slider mechanism is integrated with the cable connection assembly. As is illustrated in FIG. 4, the upper part of the adaptor holder 48 constitutes the slider mechanism 60, together with several other components. The upper part of the adaptor holder 48 is hereinafter referred to as a "cap member" of the adaptor holder. For convenience of presentation and description, an upside-down exploded view of the slider mechanism is illustrated in FIG. 5.

Figure 5:
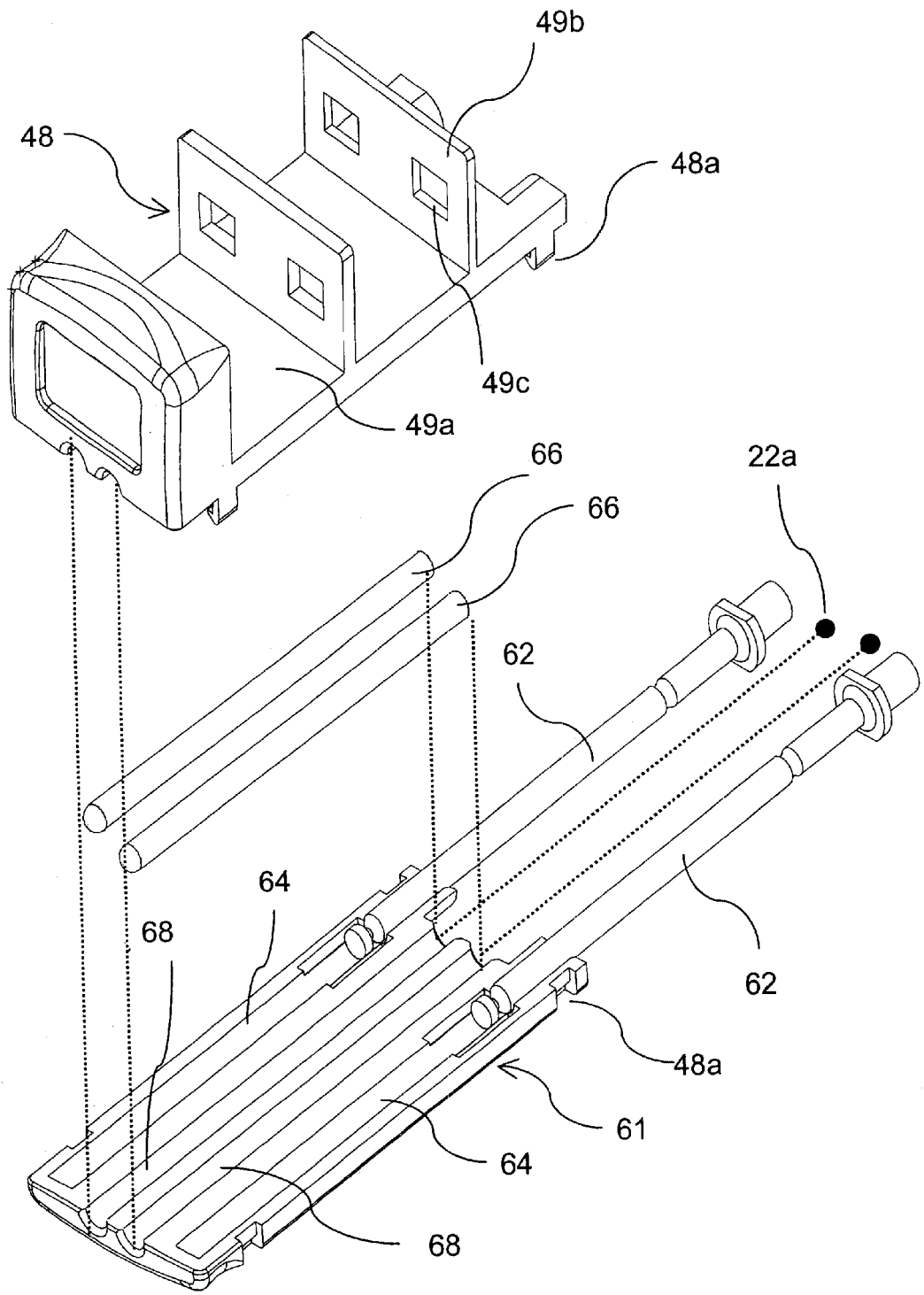
FIG. 5 is an exploded view of a slider mechanism of the high density fibre optic connector interface.

Referring to FIG. 5, the slider mechanism 60 comprises a pair of parallel slider pins 62 and a pair of parallel slider grooves 64 provided in the inner face of the cap member 61, which extend perpendicular to the elongated base member 22 of the housing 20. Although they are not shown in the figure, another pair of slider grooves are provided in the upper face of the base plate 49a which serve to form a pair of slider bores when the cap member 61 is assembled into the base plate 49a of the adaptor holder 48 and held together by snap-in male and female clip members 48a. The slider pins 62 are slidably inserted into the slider grooves 64, and one end 62d of each slider pin 62 depicted in FIG. 7 is fixed to the elongated base member 22 of the housing as shown in FIG. 8, so that the adaptor holder 48, i.e. the cable connection assembly 40 is able to be slidably moved along the slider pins 62. Consequently, by simply pulling it out, the cable connection assembly 40 can be snapped-out and exposed, thus providing easy access for maintenance or inspection purposes, as is clearly illustrated in FIG. 8.

FIGS. 6A and 6B show the detailed structure of the slider grooves 64 provided in the cup member 61 of the cable connection assembly 40. FIG. 6B is a cross-sectional view along the line A—A in FIG. 6A, showing a side configuration of the groove 64, and FIG. 7 depicts a side view of the slider pin 62, which is provided with two circular grooves 62a and 62b. As is shown in FIGS. 6A and 6B, the slides groove 64 is provided with a resilient member 65 having a protrusion 65a which is in cooperation with the circular groove 62a of the slider pin 62 so that the cable connection assembly 40 can be prevented from escaping from the slider pin 62, i.e. from the fibre optic connector interface 10, and kept in place, during maintenance or inspection at the slide-out position, as is shown in FIGS. 5 and 8. Furthermore, the protrusion 65a cooperates with another circular groove 62b provided in the slider pin 62 so that the cable connection assembly 40 can be kept in place when in the operation position, i.e. the snapped-in position.

Preferably, as is shown in FIGS. 6A and 6B, the protrusion 65a of the resilient member 65 is provided with a slant face 65b facing the elongated base member 22 of the housing. The slant face 65b cooperates with the resilient member 65 so that insertion of the slider pin 62 is facilitated when assembling the slider mechanism 60. The movement of the cable connection assembly 40 from the slide-out position to the slide-in position is also likewise facilitated.

Figure 9A:
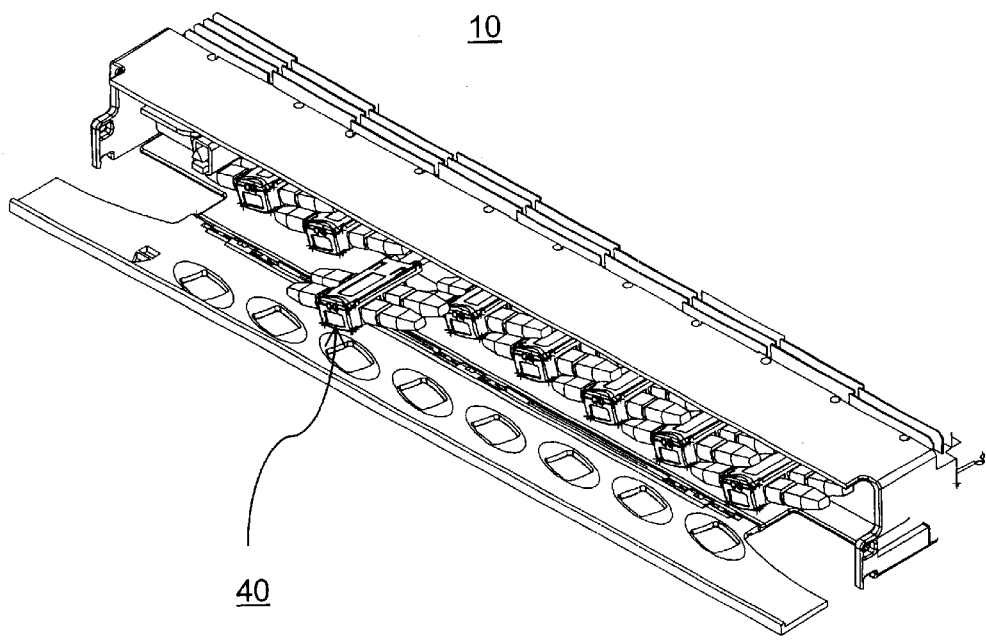
FIG. 9A is a perspective view of the high density fibre optic connector interface showing the snap-out status of a single cable connection assembly.
Figure 9B:
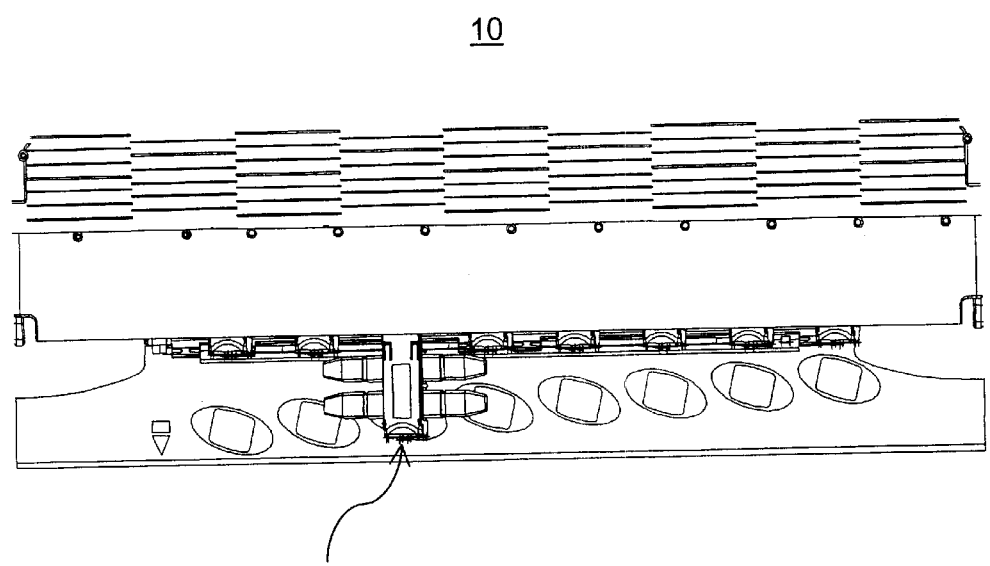
FIG. 9B is a top view of the FIG. 9A.

With the slides mechanism described above, every single cable connection assembly 40 can be fully withdrawn, as is clearly represented in FIGS. 9A and 9B, which are a perspective view and a top view respectively of the high density fibre optic connector interface showing the snap-out position of a single cable connection assembly. As is apparent from the figures, the high density fibre optic connector interface provides for easy access to every single cable connection assembly for inspection or maintenance purposes with little or no disturbance to other cable connection assemblies, in particular, neighboring ones, while providing for high density of cable connection inside the limited housing space and, at the same time, meeting the various stringent requirements for the fibre optic cable, including minimum cable bend radii and so forth.

Preferably, the high density fibre optic connector interface 10 further includes a transmission indicating means 66 provided in the body of the cable connection assembly 40, allowing for observation of operating status inside the circuit pack 1. In this embodiment, as is shown in FIG. 5, the transmission indicating means comprises a pair of light pipes 66 fixedly inserted inside a pair of through-holes formed in the body of the cable connection assembly 40. Similarly to the slider bores of the slider mechanism, the through-holes are defined by a pair of grooves 68 parallel to the slider grooves 64. Referring to the FIGS. 5 and 8, first ends of the light pipes 66, being fixedly located in the through-holes, are exposed to the outside through the front face of the cable connection assembly 40. The opposing ends of the light pipes 66 are aligned with respective holes 22a provided in the elongated base member 22 so that a light signal is transmitted to each light pipe 66 through its associated hole 22a in the snapped-in position. The light signal is viewed from the outside through the windows 28 of the housing cover 26 shown in FIG. 3B. The light signal may be produced by at least one LED (light emitting diode) which is attached behind the elongated base member 22 in positions corresponding to the holes 22a and which are activated when an interruption or failure of operation in the circuit pack occurs, thereby providing maintenance personnel with a ready means for finding the location of the failed components.

As is described above, the housing cover 26 includes a plurality of windows 28 at the positions corresponding to the front face of each of the cable connection assemblies 40 so that the front faces are able to be exposed through those windows with the housing cover 26 closed, allowing a visual observation or inspection. Likewise, since one end of the light pipe 62 is exposed at the front face of the cable connection assembly, the operating status of the circuit pack 1 can be easily observed from the outside with the housing cover 26 closed, as is shown in FIG. 3B.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

What is claimed is:

1. A high density fibre optic connector interface comprising:
    an elongated base member;
    a plurality of cable connection assemblies arrayed along the elongated base member; and
    a plurality of slider mechanisms each corresponding to a respective one of the cable connection assemblies, each of the slider mechanisms comprising a slider pin, a first end of the slider pin being fixed to the elongated member and the remainder of the pin being slidably disposed in a slider bore provided in a body of the corresponding cable connection assembly, thereby enabling each individual cable connection assembly to be slidably drawn away from the elongated base member for access and to be slidably pushed back into an operating position against the elongated base member.

2. A high density fibre optic connector interface according to claim 1, further including an elongated housing defined in part by the elongated base member.

3. A high density fibre optic connector interface according to claim 2, wherein the elongated housing includes a housing cover.

4. A high density fibre optic connector interface according to claim 3, wherein a frontal face of each cable connection assembly is exposed to the outside through an associated window provided in the housing cover so that visual inspection of each cable connection assembly is allowed with the housing cover closed.

5. A high density fibre optic connector interface according to claim 2, wherein the elongated housing includes orifices through which cables enter and exit from the connector interface.

6. A high density fibre optic connector interface according to claim 2, wherein each cable connection assembly is slanted relative to longitudinal axis of the housing.

7. A high density fibre optic connector interface according to claim 2, wherein the cable connection assemblies are arrayed in a row along a line slanted relative to longitudinal axis of the housing and extending lengthwise of the housing with the neighboring cable connection assemblies being in overlapping relation to each other.

8. A high density fibre optic connector interface according to claim 2, wherein plural rows of cable connection assemblies are arrayed along parallel lines slanted relative to longitudinal axis of the housing and extending lengthwise of the housing with the neighboring cable connection assemblies being in overlapping relation to each other.

9. A high density fibre optic connector interface according to claim 1, wherein each slider mechanism includes a pair of said slider pins being parallel to each other, first ends of the slider pins being fixed to the elongated base member and the remainder being slidably disposed in a respective one of slider bores provided in the body of the cable connection assembly, thereby allowing the cable connection assembly to be slidably movable along the slider pins toward and away from the elongated base member.

10. A high density fibre optic connector interface according to claim 9, wherein the slider bore further includes a resilient member having a protrusion which cooperates with a circular groove provided in the slider pin to provide a snap action effect so that the cable connection assembly is prevented from escaping from the slider pin and is releasably held in place when in the access position.

11. A high density fibre optic connector interface according to claim 1, wherein each cable connection assembly includes at least one transmission failure indicator.

12. A high density fibre optic connector interface comprising:
    an elongated base member;
    a plurality of cable connection assemblies arrayed along the elongated base member; and
    a plurality of slider mechanisms mounted on the elongated base member, each of the slider mechanisms supporting a respective one of cable connection assemblies, and enabling each individual cable connection assembly to be slidably drawn away from the elongated base member for access and to be slidably pushed back into an operating position against the elongated base member; and
    wherein each cable connection assembly comprises a first cable connector, a second cable connector, an adaptor for receiving the first and second cable connectors, and an adaptor holder for holding at least one adaptor.

13. A high density fibre optic connector interface according to claim 12, wherein the adaptor holder includes a resilient flange which cooperates with an opening provided therein so that the adaptor is snapped-in and held in place.

14. A high density fibre optic connector interface comprising:
    an elongated base member;
    a plurality of cable connection assemblies arrayed along the elongated base member; and
    a plurality of slider mechanisms mounted on the elongated base member, each of the slider mechanisms supporting a respective one of cable connection assemblies, and enabling each individual cable connection assembly to be slidably drawn away from the elongated base member for access and to be slidably pushed back into an operating position against the elongated base member; and
    wherein each slider mechanism provides a snap action effect to releasably retain each cable connection assembly in the access position and the operating position.

15. A high density fibre optic connector interface according to claim 14, wherein the slider mechanism is integrated with the cable connection assembly.

16. A high density fibre optic connector interface according to claim 15, wherein each one of the slider mechanisms comprises a pair of parallel slider pins, first ends of the slider pins being fixed on the elongated base member and the remainder being slidably disposed in a respective one of slider bores provided in the body of the cable connection assembly, thereby allowing the cable connection assembly to be slidably movable along the slider pins toward and away from the elongated base member.

17. A high density fibre optic connector interface according to claim 16, wherein the slider bore further includes a resilient member having a protrusion which cooperates with a circular groove provided in the slider pin to provide the snap action effect so that the cable connection assembly is prevented from escaping from the slider pin and releasably held in place when in the access position.

18. A high density fibre optic connector interface according to claim 16, wherein the resilient member with the protrusion cooperates with another circular groove provided in the slider pin to provide the snap action effect so that the cable connection assembly is releasably held in place when in the operating position.

19. A high density fibre optic connector interface according to claim 16, wherein the protrusion includes a slant face for facilitating an initial insertion of the cable connection assembly into the slider pin.

20. A high density fibre optic connector interface comprising:

an elongated base member;

a plurality of cable connection assemblies arrayed along the elongated base member; and a plurality of slider mechanisms mounted on the elongated base member, each of the slider mechanisms supporting a respective one of cable connection assemblies, and enabling each individual cable connection assembly to be slidably drawn away from the elongated base member for access and to be slidably pushed back into an operating position against the elongated base member; and wherein each cable connection assembly includes at least one transmission failure indicator.

21. A high density fibre optic connector interface according to claim 20, wherein the transmission failure indicator comprises a light pipe fixedly disposed in a through-hole provided in the cable connection assembly for transmitting a failure indicating light signal through the cable connection assembly whereby such signal may be seen by maintenance personnel.

22. A high density fibre optic connector interface according to claim 21, wherein one end of the light pipe is aligned with a hole provided in the elongated base member, whereby the failure indicating light signal may be transmitted via the hole and the light pipe.

23. A high density fibre optic connector interface according to 21, further including an elongated housing defined in part by the elongated base member, the housing including a housing cover having spaced-apart windows each corresponding to the location of a respective one of cable connection assemblies so that the failure indicating light signal may be seen through the window with the housing cover closed.

* * * * *